United States Patent Office 3,341,602
Patented Sept. 12, 1967

3,341,602
PREPARATION OF HALOGENATED KETONES
Louis G. Anello, Basking Ridge, and Richard F. Sweeney, Randolph Township, Morris County, N.J., assignors to Allied Chemical Corporation, New York, N.Y., a corporation of New York
No Drawing. Filed Feb. 10, 1965, Ser. No. 431,706
28 Claims. (Cl. 260—586)

This invention relates to a process for the preparation of perhalogenated cyclohexanones and perhalogenated cyclopentanones.

The preparation of a novel class of chemical compounds having the formula:

I

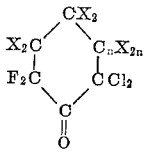

wherein X may be F or Cl and $n$ may be 0 or 1, is disclosed in co-pending, commonly assigned application of Louis G. Anello and Richard F. Sweeney, Serial No. 420,154, filed December 21, 1964, which application is in turn a continuation-in-part of co-pending, commonly assigned application of Louis G. Anello and Richard F. Sweeney, Serial No. 381,229, filed July 8, 1964, now abandoned.

Compounds embraced by Formula I are characterized by being perhalogenated cyclohexanones and cyclopentanones, the halogen atoms being fluorine or chlorine, there being present a minimum of two of each, ring-substituted in the molecule. These compounds are useful as sealing adjuvants for films of polytrifluorochloroethylene.

The process disclosed in the above mentioned applications for the preparation of the ketone compositions of Formula I involves the photochlorination of the corresponding 1-chloro-2-alkoxy-perhalogenated cycloalkenes at temperatures in the range of about 25° C.–150° C.

It is an object of this invention to provide an alternate route to perhalogenated cyclohexanones and cyclopentanones of the type indicated by Formula I.

Other objects and advantages of the invention will become apparent from the following description.

It has been found that the compounds of Formula I may be prepared by reacting ethers of the formula:

II

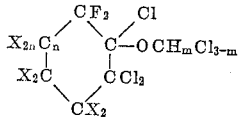

wherein X and $n$ are as defined in Formula I and $m$ may be 1 or 2, with conc. $H_2SO_4$. The reaction proceeds smoothly and the perhalogenated ketone products are obtained from the corresponding ether starting materials in conversions of about 70–90% and higher.

Ethers of the formula:

III

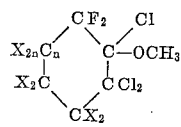

wherein X and $n$ are as above defined, may also be reacted with conc. $H_2SO_4$ to form the corresponding perhalogenated ketones; however, when such compounds are employed as starting materials, the conversions of ether to sought-for perhalogenated ketone are notably low and are in the range of about 20–30%.

The essence of this invention lies in the discovery that the replacement of one or two hydrogen atoms with chlorine atoms in compounds of the type indicated by Formula III, will result in intermediate ether products which can be cleaved to the corresponding perhalogenated cyclic ketone products, with conc. $H_2SO_4$, in high conversions. (The intermediate ether products are represented by Formula II.)

The discovery that chlorine substitution in the methyl group, of such ethers as defined by Formula III, greatly increases the ease and percent of conversion of such materials to the corresponding perhalogenated ketones, by treatment with conc. $H_2SO_4$, is highly unexpected in view of the known state of the art, which indicates that as a general rule, $H_2SO_4$ is not effective in the cleavage of ethers, and particularly in view of the teachings in the art that cleavage of ethers takes place with more difficulty and less efficiency, if at all, as a given ether molecule becomes more highly chlorinated.

For example, it is reported by Robert L. Burwell, Jr., Chem. Rev., vol. 54, p. 632 (1954), that ". . . sulfuric acid is not of much use in the cleavage of ethers . . .". This is accounted to what the author refers to as the relatively slight nucleophilic displacing tendency of the bisulfate ion. Strong $H_2SO_4$, he reports, is not effective because conjunct polymerization results. A number of other workers have reported that a variety of ethers are chemically and thermally stable and resist attack by $H_2SO_4$. R. A. Shepard et al., J. Org. Chem., vol. 23, p. 2011 (December 1958), report that materials such as trichloromethyl ether and 1-chloro-2-ethoxyhexafluorocyclopentene are very stable materials and resist attack by $H_2SO_4$. J. D. Park et al., J. Org. Chem., vol. 23, p. 1474 (1958) report that chlorinated ethers of the type $$CH_2ClCCl_2OCF_2CF_2H$$

are stable compounds resistant to hydrolysis in the presence of $H_2SO_4$. As suggested by some of the above noted authors and from a study of their findings, it can be concluded that, as a general rule, the more highly chlorinated a given ether, the more resistant it is to cleavage and that this is particularly true when it is attempted to use $H_2SO_4$ as the cleaving agent. For example, R. A. Shepard et al., supra, report that a non-chlorinated ether, such as ethyl ether, is attacked by $H_2SO_4$ (90%), whereas trichloromethyl ether is extremely stable and resists attack by this acid. K. E. Rapp et al., J. Amer. Chem. Soc., vol. 74, p. 749 (February 5, 1952), report that the cleavage of chlorinated polyfluoroalkyl ethers takes place with aluminum chloride (a much more effective cleaving agent than sulfuric acid); but also report that cleavage of these materials takes place at a much slower rate than the rate at which the corresponding unchlorinated parent ethers are cleaved with the same reagent. Conc. $H_2SO_4$ had no hydrolyzing effects on the chlorinated polyfluoroalkyl ether compositions. J. D. Park, in a publication in conjunction with other workers, J. Amer. Chem. Soc., vol. 76, p. 1387 (1954), reports that chlorinated ethers of the type $CCl_3CCl_2$—O—$CF_2CFCl_2$ are very stable compounds which undergo none of the reactions to which (non-chlorinated) alkyl and (lesser chlorinated) chloroalkyl ethers are usually susceptible, such as hydrolysis in the presence of $H_2SO_4$.

In view of the above-described state of the art, it was entirely unexpected to find that chlorine substitution in the ethers of Formula III, of the order indicated hereinbefore, would result in intermediates which will readily cleave with $H_2SO_4$ to the corresponding perhalogenated cyclic ketones, with high conversions and more surprising, with higher conversions than those obtained when the corresponding unsubstituted ethers of Formula II are employed.

It has been found that a broader range of perhalogenated cyclic ketones than those embraced by Formula I and disclosed in the above-noted co-pending applications, may be prepared according to the invention process. The broader range of compounds may be represented by the following formula:

IV 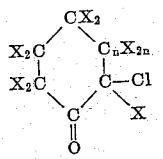

wherein X may be F or Cl and $n$ may be 0 or 1, there being at least one fluorine atom present in the molecule.

The starting materials employed to produce the compounds of Formula IV may be represented by the following formula:

V 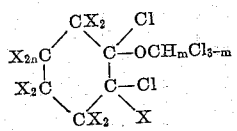

wherein X and $n$ are as defined above and $m$ may be 1 or 2, there being at least one fluorine atom present in the molecule.

The starting materials of Formula II may be prepared by photochlorinating, at low temperatures, methoxyperhalogenated cycloalkenes having the formula:

VI 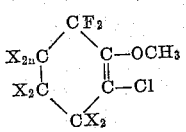

wherein X and $n$ are as defined in Formula II. The methoxyperhalogenated cycloalkene starting materials are normally liquids at room temperature and may be prepared by reacting the corresponding dichloro-perhalogenated cycloalkene, wherein two chlorine atoms are vicinally attached to the unsaturated carbon atoms, with an alkali metal alkoxide. The type reaction is more fully described in co-pending, commonly assigned application of Richard F. Sweeney, Ser. 348,277, filed Feb. 28, 1964 and is carried out in a reaction medium comprising a polar solvent, preferably in alkanol corresponding to the alkali metal alkoxide starting material employed, at temperatures from about 0° to about 90° C.

The starting materials of Formula V may be prepared by photochlorinating, at low temperatures, methoxyperhalogenated cycloalkenes having the formula:

VII 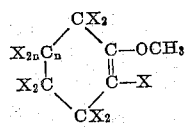

wherein X and $n$ correspond to the values and meanings of the compounds of Formula V. The methoxyperhalogenated cycloalkene starting materials of Formula VII may be prepared by an analogous procedure to that described for the preparation of the methoxyperhalogenated cycloalkene starting materials of Formula VI. Compounds embraced by Formula VII in which the single X atom is F may be prepared by reacting the appropriate perchlorofluorocycloalkene, in which one chlorine atom and one fluorine atom are vicinally attached to the unsaturated carbon atoms, with an alkali metal alkoxide, as described above. Such perchlorofluorocycloalkenes may be prepared by reacting the corresponding dichloro-perhalogenated cycloalkene, wherein two chlorine atoms are vicinally attached to the unsaturated carbon atoms, with HF at temperatures in the range of about 400–550° C., in the presence of a chromic oxide ($Cr_2O_3$) catalyst. The process is illustrated and is more fully described in co-pending, commonly assigned application of Louis G. Anello and Richard F. Sweeney, Ser. No. 431,721, filed Feb. 10, 1965.

Operating temperatures for the photochlorination reaction should be maintained below about 25° C. Some yields of products within the scope of Formulae II and V will be formed at temperatures above about 25° C., although in progressively decreasing yields as the reaction temperatures increase. At temperatures substantially below about 0° C., the starting materials of Formulae VI and VII, having increased viscosity, will consume chlorine at a much reduced rate. For optimum results, operating temperatures for the photochlorination reaction should be maintained between about 0° and 10° C.

The photochlorination reaction can be carried out in an ordinary Pyrex vessel, although a higher photon efficiency can be obtained if a vessel made of quartz or Vycor glass is used. The reaction vessel can be optionally equipped with a gas inlet dip tube, a condenser, a stirrer, a thermometer and heating or cooling means.

The specific light source used in the photochlorination reaction is not critical. The reaction will take place when chlorine gas is passed through the ether starting materials of Formulae VI and VII, while the reaction mixture is exposed to any source of actinic radiation. Actinic radiation may be defined as the action of any light which effects chemical change. Thus, any form of light which effects chemical reaction may be employed, such as ordinary sunlight, ultraviolet light, commercial incandescent light and fluorescent light. The preferred form of light is ultraviolet which can conveniently be provided by any commercial mercury arc lamp or sun lamp. It has been found that a commercial high pressure mercury arc lamp enclosed in a Vycor water jacket, which lamp is maintained at a distance of 1 to 3 inches from the reaction vessel, affords a particularly good temperature control although the intensity of the light used is not critical. As a general rule, the speed of the reaction will be directly proportional to the intensity of light employed.

Due to the relatively low temperatures at which the photochlorination reaction must be run, it is important that means be provided for removing the heat generated by the light producing lamps. This can be done by any suitable means and is conveniently accomplished by placing the lamp in a water cooled Vycor or quartz immersion well, which is set directly into the reaction vessel. The reaction vessel, in turn, is placed into an ice water cooling bath. Such means also assist in removing reaction exotherm which tends to bring up the temperature in the reactor.

The rate of chlorine addition to the starting materials is determined in part by the efficiency with which the exothermic heat of reaction is dissipated by the cooling means. Higher rates of chlorine consumption require, as will be understood, higher rates of heat removal from the reaction mixture to maintain reaction temperatures below the desired 25° C. limit. Thus, the upper limitation on chlorine addition rate is the heat removal capacity of the heat exchange equipment used within the reactor volume and the lower limitation on chlorine addition rate is governed by the commensurately longer time which would be required to complete the reaction at the lower chlorine addition rates.

The products obtained as a result of the above described photochlorination reaction will be those defined by Formulae II and V and will additionally include compounds, as described by Formulae II and V, wherein $m$ is 3. As explained heretofore, it is only the monochloromethoxy-compounds (wherein $m$ is 2) and the dichloromethoxy-compounds (wherein $m$ is 1), and not the methoxy compounds (wherein $m$ is 3) of Formulae II and V, which are useful according to the invention process. Depending upon the ratio of chlorine to starting ether employed, the reaction can be controlled selectively to yield products in which the methoxy group is predominantly unchlorinated, monochlorinated, dichlorinated, or a mixture of predominantly monochlorinated and dichlorinated products. All that is required to obtain the monochlorinated or dichlorinated products is use of the stoichiometric quantity of chlorine required for mono- or dichloro substitution, or a slight excess thereover.

In practice, when a more or less consistent chlorine flow rate is employed, the distribution of the products will depend upon the length of time the chlorination reaction is allowed to proceed. The extent of chlorination in the product can be determined by examining the ratio of the moles of HCl evolved during the photochlorination reaction, to the total moles of starting ether charged. This can be accomplished by weighing the water scrubber or by measuring the amount of HCl absorbed in the water scrubber, such as by the Volhard chloride determination. Generally, it has been found in the case of both the cyclopentyl and cyclohexyl ether starting materials, that when chlorination is effected until about 0.3 moles of HCl per mole of starting ether have evolved, the product mixture consists essentially of the (non-chlorinated) methoxy derivative (i.e. those compounds described by Formulae II and V wherein $m$ is 3). For reasons made apparent by previous discussion, in the $H_2SO_4$ cleavage reaction, it is desirable to employ ether starting materials of the type indicated by Formula III in which at least one chlorine atom is substituted for one of the hydrogen atoms in the methoxy group. It is accordingly desirable to continue the photochlorination reaction until at least approximately 0.7 moles of HCl per mole of starting material are evolved, in which case the product mixture consists of substantial amounts of at least the corresponding monochloromethoxy ether. If the photochlorination reaction is continued until at least 1.3 moles of HCl per mole of starting material are evolved, the product mixture consists of approximately equal proportions of the corresponding monochloro- and dichloromethoxy ethers. If the photochlorination reaction is further continued until about 2.0 moles of HCl per mole of starting material are evolved, the product consists essentially of the corresponding dichloromethoxy ether.

The above described photochlorination process is more fully described in co-pending, commonly assigned application of Richard F. Sweeney, Serial No. 408,391, filed November 2, 1964.

In the event that the various (non-chlorinated) methoxy ether products are recovered in the above described photochlorination reaction to any large extent, or are otherwise available; these materials can be converted to the corresponding monochloromethoxy and dichloromethoxy ether products and mixtures thereof, by the photochlorination procedure described above, which chlorinated ether products are then available for the $H_2SO_4$ cleavage step. The chlorinated ether products, present as monochloromethoxy ethers, dichloromethoxy ethers, or mixtures thereof, whether obtained directly from the photochlorination of the corresponding unsaturated ethers described by Formulae VI and VII, or whether produced by the photochlorination of the corresponding saturated (non-chlorinated) methoxy ethers described by Formulae II and V, may be used in the $H_2SO_4$ cleavage step without distillation or separation into their individual components.

The cleavage reaction may be carried out with conc. $H_2SO_4$, oleum, $SO_3$ or mixtures thereof. There is no critical minimum concentration required for $H_2SO_4$ when used; however, generally, the more dilute the $H_2SO_4$ employed, the larger will be the proportion of ketone product which will be lost due to the reaction of the latter with water present in the reaction mixture. Accordingly, the higher the concentration of $H_2SO_4$ employed, the better will be the results.

Although the term "concentrated" is a relative one, for the purposes of this paper, it will be considered as referring to at least 60% $H_2SO_4$. It is preferred to use $H_2SO_4$ having a concentration of at least about 95% and best results are obtained when 100% $H_2SO_4$ is employed. Due to the excellent dehydrating properties of 100% $H_2SO_4$ and to the fact that such a reagent contributes little or no water to the reaction mixture; when 100% $H_2SO_4$ is employed, the ketone products are obtained to the virtual exclusion of the ketone hydrates. If less concentrated solutions of $H_2SO_4$ are employed, it is advantageous to add a powerful dehydrating agent, such as phosphorous pentoxide or sulfur trioxide, to the reaction mixture in order to take up any water that may be present.

Oleum consists of $H_2SO_4$ and $SO_3$, e.g. so-called "20% oleum" consisting by weight of 80% $H_2SO_4$ and 20% free $SO_3$. The $H_2SO_4$ component of the oleum will be understood as referring to 100% $H_2SO_4$ concentration. The term "oleum" as used herein is intended to refer to any mixture of $SO_3$ and 100% $H_2SO_4$. Use of oleum containing an $SO_3$ strength of about 2–15% may be used to advantage. There is no upper limit on the $SO_3$ strength of oleum which may be employed according to the invention process, since pure $SO_3$ may be used. A practical upper limit for $SO_3$ strength, when oleum is employed, is about 60%.

In carrying out the cleavage reaction, the cleaving agent is normally added to the ether starting material in an amount at least equal to the stoichiometric. Reaction will take place with less than stoichiometric amounts of cleaving agent, although with diminished conversions. It is desirable to employ an excess of cleaving agent in order to insure completion of the reaction. Very large excesses of cleaving agent will not adversely affect the reaction. When 100% $H_2SO_4$ is employed, for example, molar ratios of $H_2SO_4$ to starting ether in the order of 1:1–20:1 may be used with expediency. The preferred molar ratio of $H_2SO_4$ to starting ether is in the range of about 1.5:1–5:1.

The reaction between the cleaving agent and the starting ether must be initiated by the application of heat. At between about 120–150° C. reaction takes place as evidenced by the evolution of HCl and care must be taken to control a vigorous exotherm. The reaction should be continued by heating slowly to about 185–200° C. at which time the reaction should be substantially complete. Progress and completion of the reaction may be checked by measuring the amount of HCl evolved, such as by the Volhard chloride determination.

The ketone product distills out of the reaction mixture and may be used as is, or be further purified by redistillation from conc. $H_2SO_4$, or without conc. $H_2SO_4$. When oleum, and particularly pure $SO_3$ is used as the cleaving agent, it is particularly desirable to redistill the ketone product from conc. $H_2SO_4$ to remove $SO_3$ which distills over with the ketone.

The following examples illustrate practice of the invention. Parts and percentages are by weight unless otherwise indicated. Percent conversions were computed by dividing the moles of desired ketone product formed by the moles of the ether reactant charged and multiplying by 100.

EXAMPLE 1

The apparatus consisted of a 3¼" I.D. by 10" round bottom tubular Pyrex reactor, which was fitted with a Vycor water-cooled immersion well containing a commercial mercury arc light. The reactor is further equipped with an inlet tube at the bottom for chlorine gas and an outlet at the top of the reactor for exit gas. The apparatus was constructed and arranged so that gases exiting from the outlet were passed first through a water cooled condenser and then through a water scrubber and caustic scrubber. The caustic scrubber contained a 10% solution of aqueous sodium hydroxide. The tubular reactor, which was maintained in an ice-water bath so as to control temperatures therein to between about 0° and 5° C., was charged with 100 g. (0.415 mole) of 1-chloro-2-methoxyhexafluorocyclopentene. 29.8 g. (0.420 mole) of chlorine was passed into the reactor via the inlet tube, over a period of about 2¾ hours, during which time the reactor contents were irradiated with the mercury arc light. The arc light was positioned about 1″ from the reactor. At the end of the reaction period, neither HCl nor unreacted chlorine were detected in vapor exiting from the reactor. The product mixture weighed 120 g. A small sample of the product mixture was chromatographed on a column made up of Silicone (Fluoro) oil, FS–1265 (QF–1), on fire brick at 140° C. The chromatographic analysis showed that the product mixture was composed of 21 volume percent 1-chloro-2-methoxyhexafluorocyclopentene, 11 volume percent 1-chloro-2-monochloromethoxyhexafluorocyclopentene, 61 volume percent 1,1,2-trichloro-2-methoxyhexafluorocyclopentane and 7 volume percent 1,1,2-trichloro - 2 - monochloromethoxyhexafluorocyclopentane. Upon fractional distillation, 31 g. of essentially pure 1,1,2-trichloro-2-methoxyhexafluorocyclopentane (B.P. 169–173° C.) were recovered from the product mixture.

*Analysis*: Calculated for $C_6H_3Cl_3F_6O$: C, 23.11%; H, 0.96%; F, 36.6%; Cl, 34.19%. Found: C, 23.02%; H, 0.80%; F, 36.3%; Cl, 33.85%.

The 31 g. of 1,1,2-trichloro-2-methoxyhexafluorocyclopentane, together with 30 g. of 100% $H_2SO_4$, were charged to a 100 ml. three-necked flask, equipped with a short distillation column, distillation head, thermometer, Dry Ice trap and water trap. The reactant mixture was heated slowly up to about 200° C. and distillate boiling in the range of 80–165° C. was collected. Gas-liquid chromatography of the distillate showed that it consisted of 28 volume percent 2,2-dichlorohexafluorocyclopentanone and 72 volume percent unreacted 1,1,2-trichloro-2-methoxyhexafluorocyclopentane. Based upon the chromatographic data, the conversion of 1,1,2-trichloro-2-methoxyhexafluorocyclopentane to 2,2-dichlorohexafluorocyclopentanone was 28%.

EXAMPLE 2

The apparatus used was the same as that described in Example 1, except as hereinafter noted. The round bottom tubular reactor was charged with 100 g. (0.42 mole) of 1-chloro-2-methoxyhexafluorocyclopentene. 89.9 g. (1.27 moles) of chlorine were passed into the reactor via the inlet tube, over a period of about 12 hours, during which time the reactor contents, as before, were irradiated with the mercury arc light. At the end of the reaction period, a total of 16.5 g. of HCl was scrubbed from the vapor exiting the reactor. The product mixture weighed 142.0 g. A small sample of the product mixture was analyzed by gas-liquid chromatography. The chromatographic analysis showed that the product contained 68.5 volume percent 1,1,2-trichloro-2-monochloromethoxyhexafluorocyclopentane, 23.7 volume percent 1,1,2-trichloro-2-dichloromethoxyhexafluorocyclopentane and 3.5 volume percent 1,1,2-trichloro-2-methoxyhexafluorocyclopentane.

The product mixture was charged to a 250 ml. three-necked flask, equipped for distillation as described in Example 1. To the product mixture in the flask were added 107 g. of 100% $H_2SO_4$ and the resulting mixture was heated slowly up to about 200° C. A total of 87 g. of material distilled off at 86–88° C. The infrared spectrum of this material corresponded to the infrared spectrum of the material identified in Example 1 as 2,2-dichlorohexafluorocyclopentanone. The conversion to 2,2-dichlorohexafluorocyclopentanone was 85%.

EXAMPLE 3

A 50 ml. flask, equipped with a 12 cm. micro distillation column and a distillation head, was charged with a mixture of 4.0 g. (0.01 mole) of 1,1,2-trichloro-2-methoxyoctafluorocyclohexane and 40 g. of 96% $H_2SO_4$. The reactant mixture was heated slowly up to about 200° C. HCl was evolved and product distilled off. 4 g. of a distillate were recovered, which distillate was shown by infrared spectrum analysis to consist of a mixture of 1,1,2-trichloro-2-methoxyoctafluorocyclohexane starting material and 2,2-dichlorooctafluorocyclohexanone product. Gas chromatographic analysis confirmed the identification of these materials and also showed that the composition of the product mixture was 20 volume percent 2,2-dichlorooctafluorocyclohexanone and 80 volume percent 1,1,2-trichloro-2-methoxyoctafluorocyclohexane. Conversion to 2,2-dichlorooctafluorocyclohexanone was 20%.

EXAMPLE 4

A 200 ml. flask, equipped with a thermowell and connected to an 18″ vacuum-jacketed distillation column, which in turn was fitted with a water-cooled distillation head, was charged with 65 g. of a mixture containing 44.5 g. (0.112 mole) of 1,1,2-trichloro-2-monochloromethoxyoctafluorocyclohexane and 20.5 g. (0.048 mole) of 1,1,2-trichloro-2-dichloromethoxyoctafluorocyclohexane. To the mixture in the flask was added a mixture containing 100 g. of 96% $H_2SO_4$ and 100 g. of 20% oleum.

The resulting reaction mixture was slowly heated to a temperature between about 160–185° C., allowing for a vigorous exotherm which took place between about 120–150° C. HCl was rapidly evolved. Heating of the reaction mixture was continued until the temperature of the same reached about 200° C., at which time the reaction was considered to be complete. A total of 46 g. of distillate was obtained from the distillation column. This material was redistilled to give 38 g. (0.12 mole) of 2,2-dichlorooctafluorocyclohexanone (B.P. 116–117° C.). Identity of the product was confirmed by infrared analysis and by the following chemical analysis:

*Analysis*: Calculated for $C_6Cl_2F_8O$: F, 48.87%; Cl, 22.83%. Found: F, 49.0%; Cl, 22.9%.

The conversion to 2,2-dichlorooctafluorocyclohexanone was 75%.

EXAMPLE 5

The apparatus employed was the same as that described in Example 4 and was charged with 400 g. of a mixture containing 260 g. (0.656 mole) of 1,1,2-trichloro-2-monochloromethoxyoctafluorocyclohexane and 140 g. (0.327 mole) of 1,1,2-trichloro-2-dichloromethoxyoctafluorocyclohexane. To the mixture in the reaction flask was added a mixture of 100 g. of 96% $H_2SO_4$ and 100 g. of 20% oleum. The resulting mixture was slowly heated to about 160° C., allowing for a vigorous exotherm at between about 120–150° C. During the course of the heating, HCl evolved and a product distilled over. The reaction mixture was slowly heated until after about 3¼ hours, temperature of the reaction mixture reached about 200° C. The reaction was considered complete at this point. A total of 315 g. of distillate was recovered. The 315 g. of distillate were redistilled from 96% $H_2SO_4$ to remove traces of $SO_3$. From the redistillation, a total of 282 g. (0.907 mole) of 2,2-dichlorooctafluorocyclohexanone (B.P. 116° C.) was obtained. Identity of this product was confirmed by comparison of boiling point data and infrared spectrums. The conversion to 2,2-dichlorooctafluorocyclohexanone was 92%.

When other ether starting materials, or mixtures thereof, within the scope of Formulae II and V are employed the cleavage reaction with either conc. $H_2SO_4$, oleum, $SO_3$, or mixtures of these materials, proceeds substantially as described and the corresponding ketone products are formed with good conversions.

Since those skilled in the art will readily be able to make modifications and innovations over the embodiments described, it should be understood that the invention is not to be limited except by the scope of the appended claims.

We claim:
1. The process for preparing a ketone of the formula:

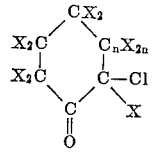

wherein X may be F or Cl and $n$ may be 0 or 1, there being at least one fluorine atom present in the molecule; which comprises reacting, at temperatures of at least about 120° C., a starting ether material of the formula:

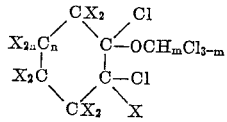

wherein X and $n$ are as defined above and $m$ may be 1 or 2, there being at least one fluorine atom present in the molecule, and a cleaving agent selected from the group consisting of $H_2SO_4$ of at least 60% concentration, oleum, $SO_3$ and mixtures thereof, and recovering the ketone produced in the reaction.

2. The process of claim 1 in which the cleaving agent is employed in an amount at least equal to the stoichiometric based on the starting ether material.

3. The process for preparing a ketone of the formula:

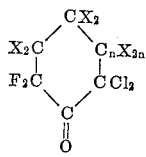

wherein X may be F or Cl and $n$ may be 0 or 1, which comprises reacting, at temperatures of at least about 120° C., a starting ether material of the formula:

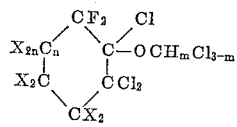

wherein X and $n$ are as defined above and $m$ may be 1 or 2, and a cleaving agent selected from the group consisting of $H_2SO_4$ of at least 60% concentration, oleum, $SO_3$ and mixtures thereof, and recovering the ketone produced in the reaction.

4. The process of claim 3 in which the cleaving agent is employed in an amount at least equal to the stoichiometric based on the starting ether material.

5. The process for preparing a ketone of the formula:

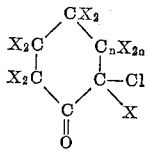

wherein X may be F or Cl and $n$ may be 0 or 1, there being at least one fluorine atom present in the molecule, which comprises:

(a) chlorinating, at temperatures below about 25° C., a starting ether material selected from the group consisting of

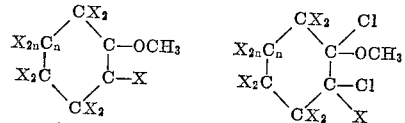

and mixtures thereof, wherein X and $n$ are as defined above, in the presence of actinic radiation for a period of time sufficient to substantially convert the starting ether material to a reaction product containing an intermediate ether material of the formula:

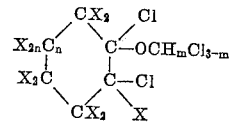

wherein X and $n$ are as defined above and $m$ may be 1 or 2, there being at least one fluorine atom present in the molecule, (b) reacting, at temperatures of at least about 120° C., the reaction product containing the intermediate ether and a cleaving agent selected from the group consisting of $H_2SO_4$ of at least 60% concentration, oleum, $SO_3$ and mixtures thereof, and (c) recovering the ketone produced in the reaction.

6. The process of claim 5 in which the intermediate ether material is isolated from the reaction product of the chlorination step prior to subsequent reaction with the cleaving agent as described in part (b).

7. The process of claim 6 in which the cleaving agent is employed in an amount at least equal to the stoichiometric based on the intermediate ether material.

8. The process of claim 7 in which the chlorination step of part (a) is carried out until at least about 0.7 moles of HCl per mole of starting ether material is evolved.

9. The process of claim 8 in which the starting ether material of part (a) is a compound of the formula:

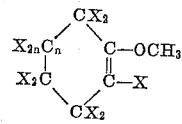

wherein X may be F or Cl and $n$ may be 0 or 1, there being at least one fluorine atom present in the molecule.

10. The process of claim 8 in which the starting ether material of part (a) is a compound of the formula:

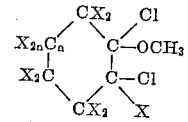

wherein X may be F or Cl and $n$ may be 0 or 1, there being at least one fluorine atom present in the molecule.

11. The process for preparing a ketone of the formula:

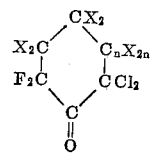

wherein X may be F or Cl and $n$ may be 0 or 1, which comprises:

(a) chlorinating, at temperatures below about 25° C., a starting ether material selected from the group consisting of:

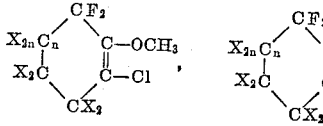

and mixtures thereof, wherein X and $n$ are as defined above, in the presence of actinic radiation for a period of time sufficient to substantially convert the starting ether material to a reaction product containing an intermediate ether material of the formula:

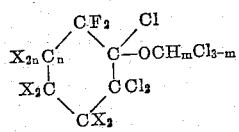

wherein X and $n$ are as defined above and $m$ may be 1 or 2, (b) reacting at temperatures of at least about 120° C., the reaction product containing the intermediate ether and a cleaving agent selected from the group consisting of $H_2SO_4$, of at least 60% concentration, oleum, $SO_3$ and mixtures thereof, and (c) recovering the ketone produced in the reaction.

12. The process of claim 11 in which the intermediate ether material is isolated from the reaction product of the chlorination step prior to subsequent reaction with the cleaving agent, as described in part (b).

13. The process of claim 12 in which the cleaving agent is employed in an amount at least equal to the stoichiometric based on the intermediate ether material.

14. The process of claim 13 in which the chlorination step of part (a) is carried out until at least about 0.7 mole of HCl per mole of starting ether material is evolved.

15. The process of claim 14 in which the starting ether material of part (a) is a compound of the formula:

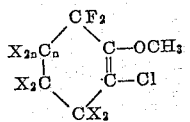

wherein X may be F or Cl and $n$ may be 0 or 1.

16. The process of claim 14 in which the starting ether material of part (a) is a compound of the formula:

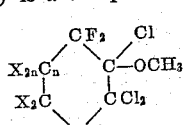

wherein X may be F or Cl and $n$ may be 0 or 1.

17. The process for preparing 2,2-dichlorohexafluorocyclopentanone which comprises reacting, at temperatures of at least about 120° C., a starting ether material selected from the group consisting of 1,1,2-trichloro-2-monochloromethoxyhexafluorocyclopentane; 1,1,2-trichloro-2-dichloromethoxyhexafluorocyclopentane and mixtures thereof, and a cleaving agent selected from the group consisting of $H_2SO_4$, of at least 60% concentration, oleum, $SO_3$ and mixtures thereof, which cleaving agent is employed in an amount at least equal to the stoichiometric based on the starting ether material, and recovering the 2,2-dichlorohexafluorocyclopentanone produced in the reaction.

18. The process for preparing 2,2-dichlorooctafluorocyclohexanone which comprises reacting, at temperatures of at least about 120° C., a starting ether material selected from the group consisting of 1,1,2-trichloro-2-monochloromethoxyoctafluorocyclohexane; 1,1,2-trichloro 2-dichloromethoxyoctafluorocyclohexane, and mixtures thereof, and a cleaving agent selected from the group consisting of $H_2SO_4$ of at least 60% concentration, oleum, $SO_3$ and mixtures thereof, which cleaving agent is employed in an amount at least equal to the stoichiometric based on the starting ether material, and recovering the 2,2-dichlorooctafluorocyclohexanone produced in the reaction.

19. The process for preparing 2,2-dichlorohexafluorocyclopentanone which comprises:

(a) chlorinating a starting ether material selected from the group consisting of 1-chloro-2-methoxyhexafluorocyclopentene-1; 1,1,2-trichloro-2-methoxyhexafluorocyclopentane and mixtures thereof, at temperatures below about 25° C., in the presence of actinic radiation, until at least about 0.7 mole of HCl per mole of starting ether material is evolved, (b) reacting, at temperatures of at least about 120° C., the reaction product thus obtained $H_2SO_4$ and having a concentration of at least 60%, which $H_2SO_4$ reactant is used in an amount at least equal to the stoichiometric based on the reaction product obtained in part (a), and (c) recovering the 2,2-dichlorohexafluorocyclopentanone produced in the reaction.

20. The process of claim 19 in which the chlorination step of part (a) is carried out until at least about 1.3 moles of HCl per mole of starting ether material are evolved.

21. The process for preparing 2,2-dichlorooctafluorocyclohexanone which comprises:

(a) chlorinating a starting ether material selected from the group consisting of 1-chloro-2-methoxyoctafluorocyclohexene-1; 1,1,2-trichloro-2-methoxyoctafluorocyclohexane and mixtures thereof, at temperatures below about 25° C., in the presence of actinic radiation, until at least about 0.7 mole of HCl per mole of starting ether material is evolved, (b) reacting, at temperatures of at least about 120° C., the reaction product thus obtained and $H_2SO_4$ having a concentration of at least 60%, which $H_2SO_4$ reactant is used in an amount at least equal to the stoichiometric based on the reaction product obtained in part (a), and (c) recovering the 2,2 - dichlorooctafluorocyclohexanone produced in the reaction.

22. The process of claim 21 in which the chlorination step of part (a) is carried out until at least about 1.3 moles of HCl per mole of starting ether material are evolved.

23. The process according to claim 1 in which the $H_2SO_4$ reactant has a concentration of at least 95%.

24. The process according to claim 3 in which the $H_2SO_4$ reactant has a concentration of at least 95%.

25. The process of claim 5 in which the $H_2SO_4$ employed in step (b) has a concentration of at least 95%.

26. The process of claim 11 in which the $H_2SO_4$ employed in step (b) has a concentration of at least 95%.

27. The process according to claim 17 in which the $H_2SO_4$ reactant has a concentration of at least 95%.

28. The process of claim 19 in which the $H_2SO_4$ employed in step (b) has a concentration of at least 95%.

References Cited

Oddo et al.: "Chem. Abst.," vol. 6, pp. 229–230, 1912.

LEON ZITVER, *Primary Examiner.*

M. JACOB, *Assistant Examiner.*

UNITED STATES PATENT OFFICE
CERTIFICATE OF CORRECTION

Patent No. 3,341,602                      September 12, 1967

Louis G. Anello et al.

It is hereby certified that error appears in the above numbered patent requiring correction and that the said Letters Patent should read as corrected below.

Column 2, line 71, for "II" read -- III --; column 3, lines 19 to 23, formula V should appear as shown below instead of as in the patent:

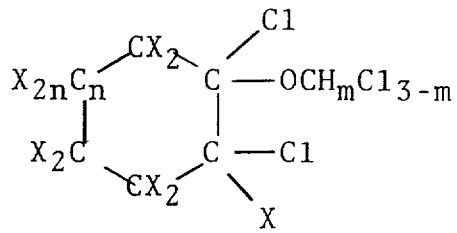

same column, lines 30 to 35, formula VI should appear as shown below instead of as in the patent:

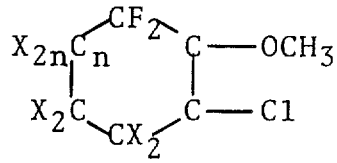

line 44, for "Ser. 348,277" read -- Ser. No. 348,277 --; same column 3, line 46, for "in" read -- an --; column 9, lines 70 to 74, the left-hand formula should appear as shown below instead of as in the patent:

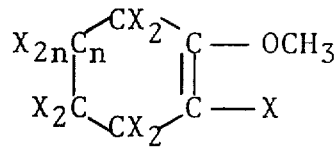

column 11, line 62, for "ro 2-" read -- ro-2- --; column 12, line 15, for "$H_2SO_4$ and" read -- and $H_2SO_4$ --.

Signed and sealed this 15th day of October 1968.

(SEAL)
ATTEST:

EDWARD M. FLETCHER, JR.                  EDWARD J. BRENNER
Attesting Officer                          Commissioner of Patents